UNITED STATES PATENT OFFICE.

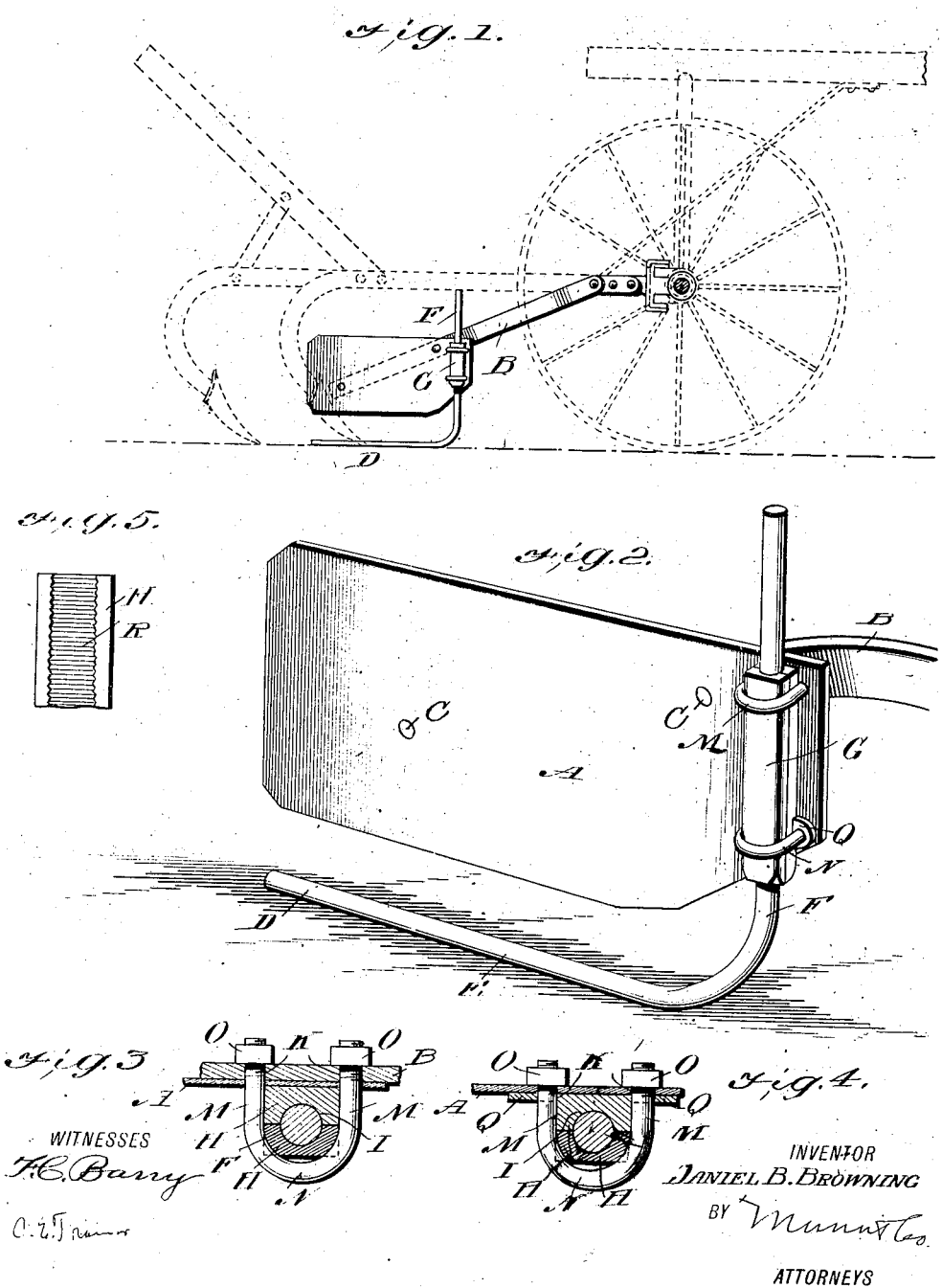

DANIEL B. BROWNING, OF MORRISON, OKLAHOMA.

CULTIVATOR ATTACHMENT.

937,674.

Specification of Letters Patent.

Patented Oct. 19, 1909.

Application filed April 9, 1909. Serial No. 488,971.

*To all whom it may concern:*

Be it known that I, DANIEL B. BROWNING, a citizen of the United States, and a resident of Morrison, in the county of Noble and State of Oklahoma, have invented certain new and useful Improvements in Cultivator Attachments, of which the following is a specification.

My invention is an improvement in cultivator attachments, and consists in certain novel constructions and combinations of parts hereinafter described and claimed.

Referring to the drawings forming a part hereof—Figure 1 is a side view of the improvement attached to a cultivator; the cultivator being shown in longitudinal section; Fig. 2 is a perspective view of the improvement detached. Fig. 3 is a transverse section through the upper yoke, and Fig. 4 is a similar view through the lower, and Fig. 5 is a front view of one of the sections of the bushing.

The present embodiment of the invention comprises a fender blade A of usual construction, having arranged diagonally thereof a hanger arm B which is secured to the fender by rivets C, the free end of the hanger being attached to the cultivator in any suitable manner.

A runner D is adjustably secured to each fender blade, the runner comprising a substantially horizontal portion E, and a vertical portion F, the vertical portion being provided at approximately the center thereof with a bushing G square in cross section as shown. The bushing consists of two sections, each section H of the bushing being provided with a longitudinal grove I, the grooves coacting to form an opening for receiving the vertical portion of the runner.

The fender at its forward end and near its upper and lower edges is provided with spaced openings K, which are adapted to receive the arms M of a yoke N, the body portion of the yoke embracing the bushing, and nuts O are provided for engaging the threaded ends of the arms to secure the yoke and the bushing in place.

It will be evident from the description, that by loosening the nuts O the runner may be adjusted vertically of the blade, whereby to bring the horizontal portion toward or from the lower edge of the said blade. The arrangement of the bushing also spaces the vertical portion of the runner away from the blade, so that the runner as a whole is off-set toward the inner side of the fender.

The inclination of the horizontal portion of the runner with respect to the fender blade may also be varied, by the same adjustment, whereby to bring the horizontal portion into alinement with the said edge, or at an angle thereto as may be desired. The operation of the improvement is as follows: The fender is supported by the hanger arm and the runner is adjusted a sufficient distance below the edge of the blade to prevent the soil thrown up by the plows from covering the plants, while permitting some of the soil to be thrown toward the plants at the roots thereof.

The engagement of the runner with the ground prevents the fender being moved out of place by the soil thrown up by the plow, as would be the case were the fender suspended from above alone. The provision of the runner also permits the fender to fall in with the inequalities of the ground, so as to perfectly protect the plants, even when they occupy a lower level than the wheels of the cultivator.

It will be observed that the openings in the fender blade for receiving the arms of the upper yoke, traverse also the hanger arm, and that the innermost section of the bushing, that is the section adjacent to the fender blade is provided with perforated ears Q upon each side through which the arms of the yoke pass, for retaining the bushing in proper position. The surfaces of the grooves through which the vertical portion of the runner passes are also corrugated as shown at R, for preventing slipping of the runner. The runner is placed on the inner side of the blade, that is on the side next to the plows, and the hanger arm is of such length that the shaft or plow will stand at a point about five of six inches in rear of the front end of the blade. At its rear end as will be observed from an inspection of Fig. 1, the runner is farther from the lower edge of the blade than it is at its front end, that is the horizontal portion of the runner is inclined rearwardly and downwardly with respect to the lower edge of the blade. It will be observed, that the runner which consists essentially of a pair of integral arms arranged at an angle to each other, is rotatably connected to the blade by one of the arms whereby the other arm may be adjusted to various angles with respect to the blade, for the purpose of varying the quantity of dirt thrown to the plant.

I claim:

1. In a cultivator, a fender blade, means for pivotally connecting the blade to the cultivator, and a runner in connection with the blade, said runner comprising a pair of arms arranged at an angle to each other, one arm being below the blade and adapted to engage the ground, and means for adjustably connecting the other arm to the blade to permit it to swing on a vertical axis for the purpose set forth, said means comprising a split bushing in which the other arm is slidable and rotatable, the blade being provided with spaced pairs of openings, and yokes whose body portions engage the bushing and whose threaded arms traverse the opening, and nuts engaging the arms for securing the parts in position.

2. In a cultivator, a fender blade, and a runner in connection with the blade, said runner comprising a pair of arms arranged at an angle to each other, one arm being below the blade and adapted to engage the ground, and the other being mounted for swinging movement on a vertical axis on the blade, whereby to permit the arm which engages the ground to swing laterally with respect to the blade for the purpose set forth, and means in connection with the attaching means for permitting said runner to be adjusted vertically with respect to the fender blade.

3. The combination with a cultivator, of a fender blade supported by the cultivator, a runner in connection with the blade, the runner comprising a pair of integral arms arranged at an angle to each other, one of the arms being adapted to engage the ground, and the other to be rotatably connected with the blade, whereby the first named arm may be adjusted to various angles with respect to the blade for the purpose set forth.

DANIEL B. BROWNING.

Witnesses:
W. L. EAGLETON,
V. H. BIDDISON.